United States Patent

[11] 3,633,179

[72] Inventor Christopher Finch Reynolds
Tring, England
[21] Appl. No. 874,307
[22] Filed Nov. 5, 1969
[45] Patented Jan. 4, 1972
[73] Assignee International Computers Limited
London, England
[32] Priority Nov. 8, 1968
[33] Great Britain
[31] 52,949/68

[54] INFORMATION HANDLING SYSTEMS FOR ELIMINATING DISTINCTIONS BETWEEN DATA ITEMS AND PROGRAM INSTRUCTIONS
4 Claims, 3 Drawing Figs.

[52] U.S. Cl. .......... 340/172.5
[51] Int. Cl. .......... G06f 15/04, G06f 15/40
[50] Field of Search .......... 340/172.5; 235/157

[56] References Cited

UNITED STATES PATENTS

| | | | |
|---|---|---|---|
| 3,229,260 | 1/1966 | Falkoff | 340/172.5 |
| 3,290,659 | 12/1966 | Fuller et al. | 340/172.5 |
| 3,293,615 | 12/1966 | Mullery et al. | 340/172.5 |
| 3,332,069 | 7/1967 | Joseph et al. | 340/172.5 |
| 3,435,423 | 3/1969 | Fuller et al. | 340/172.5 |
| 3,448,436 | 6/1969 | Machol, Jr. | 340/172.5 |

*Primary Examiner*—Raulfe B. Zache
*Assistant Examiner*—Sydney R. Chirlin
*Attorney*—Hane & Baxley

ABSTRACT: A data-processing system is disclosed in which the distinction between data items and program instructions is largely eliminated. Information is stored as statements, each of which normally consists of a name, a value, and an indicator which defines the logical relationship between the name and the value. Two statements are compared and if predetermined parts of the two statements are the same, a part of one statement, which defines a processing operation, is carried out.

INVENTOR
CHRISTOPHER FINCH REYNOLDS
BY Haneman Bayley
ATTORNEYS

INVENTOR
Christopher Finch Reynolds
BY Kane, Dalsimer, Kane, Sullivan and Kurucz [signature]
ATTORNEYS INVENTOR
CHRISTOPHER FINCH REYNOLDS
BY Kane, Dalsimer, Kane, Sullivan and Kurucz Bayley
ATTORNEYS

INFORMATION HANDLING SYSTEMS FOR ELIMINATING DISTINCTIONS BETWEEN DATA ITEMS AND PROGRAM INSTRUCTIONS

BACKGROUND OF THE INVENTION

Conventional data processing systems employ two separate and distinct sets of information, namely, problem data and program instructions. The instructions define the logical operations, such as add, multiply, and compare, which are to be carried out on items of the problem data.

The programming of essentially mathematical problems, such as occur particularly in scientific calculations, is considerably simpler than the programming of the data processing procedures which are necessary for business data processing. A prime reason for this difference is that the structure of the problem data is much more complex in business data processing. For example, the calculation of net pay for an individual, given hours worked, rate of pay per hour, etc., is a trivial operation from the mathematical point of view. However, the large number of variations to which each factor is subject in a normal business situation produces great complexity in the program. For example, the number of hours worked may be affected by sickness, paid or unpaid leave of absence, overtime, etc. Furthermore, at least some of these conditions affect the rate of pay, as well as the actual number of hours worked. Similar variations of conditions may occur at each step of the calculation, and the program must provide for all the variations alone and in combination, together with their effects on other steps of the calculation.

Although the payroll problem is superficially simple, the numbers of possible conditions require a complex program involving a great deal of programming effort. As the complexity of the initial problem increases, the complexity of the program tends to increase at a more rapid rate. It then becomes exceedingly difficult to comprehend the program as a whole, to ensure that it really does deal correctly with every possible set of conditions which may arise, and to effect any later correction or modification of the program which may be desired.

It will be apparent, therefore, that some simpler method of controlling data processing operations is desirable.

SUMMARY

The present invention provides a simplified method of controlling a data processing system. More particularly, storage is provided for fact and criteria statements, each of which consists of a series of items, and an item of a criteria statement is compared with the items of a fact statement. If there is not agreement, a level number associated with that criteria item is compared with the level number of subsequent criteria items to determine the next such item which has a level number not greater than the level number of that item.

BRIEF DESCRIPTION OF THE DRAWINGS

The invention will be described, by way of example, with reference to the accompanying drawings, in which.

DATA STRUCTURE

Figure 1A:
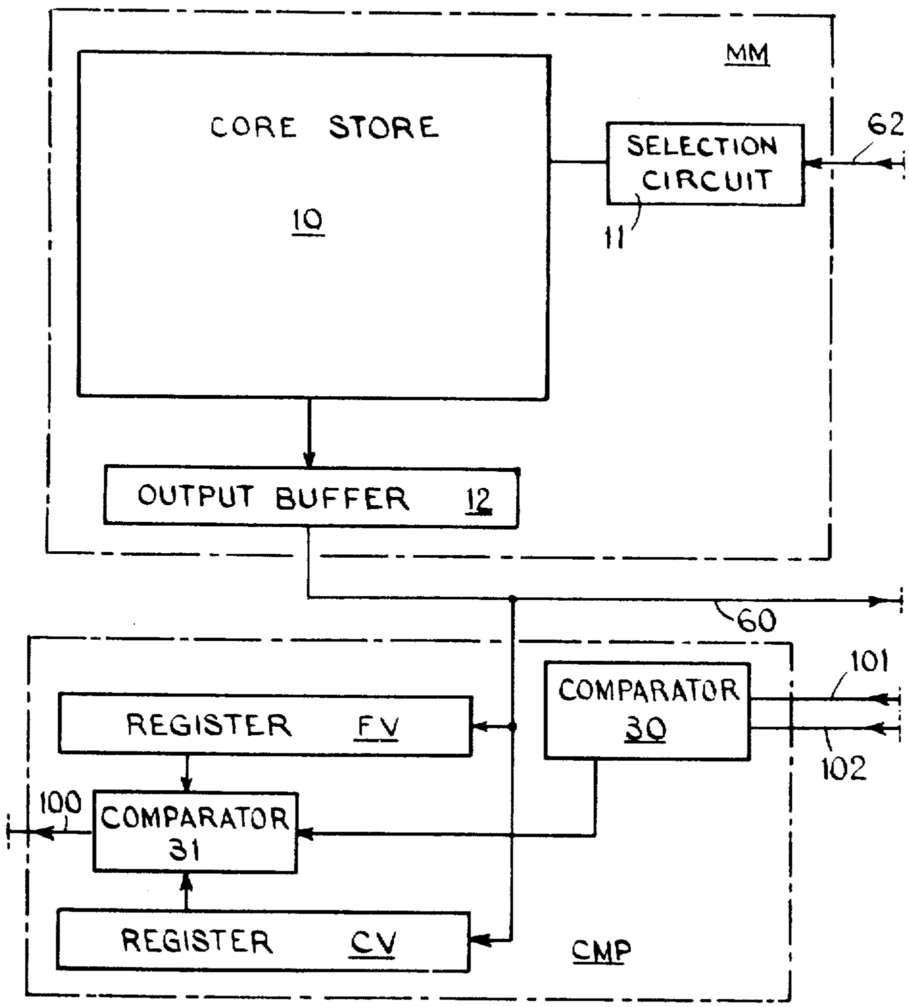
FIGS. 1A and 1B taken together constitute a block diagram of a data processing system.

In order to understand the construction and operation of the system, it is necessary to explain the structure of the data which is to be processed by the system. The basic data structure consists of items. A typical item consists of five sections which define the length (S), level (L), data name (N), logical relationship and other control information (R), and data value (V) of that item. The first four of these sections will be collectively referred to as the item control word.

The length (S) may be used to define either the length of the data value or the overall length of the item as a whole. The latter is preferable if more than one format of item control word is used, so that the item control word is not of fixed length.

The level (L) is an indicator which helps to define each data item's unique position within the system. Its normal use will be described below when describing the structure of statements.

The data name (N) defines the name of a set of objects or events of values. Thus the date name 'COMPOUND' might be used by a chemist to define the set consisting of all chemical compounds of the file. In practice the name will normally be held in the item control word in abbreviated coded form, reference being made to a stored conversion table, holding the alphanumeric equivalents, on input from, or output to, human users. However, for applications where the input/output load is very heavy compared with internal processing the item control word could be used to hold the full alphanumeric name.

The logical relationship (R) between the data name and data value can have, for example, the meanings 'Equal,' 'Not Equal,' 'Greater,' 'Greater or Equal,' 'Less,' 'Less than or Equal,' 'All,' and 'None'; in the last two cases no data value is present. The other control information may include an indicator which identifies 'fact action' items, which are items which must be obeyed unconditionally, and which may be used to define the boundaries of blocks of data within store or on supporting peripheral devices, or to define how the following data items can be used, or to define who is entitled to use the data. In any implementation which uses more than one data format, control information will define the format of the value (i.e. alphanumeric, fixed point decimal, floating point, binary, etc.) and additionally may include information on the precision of the number and/or the position of the decimal point. In addition, it may include an end of statement indicator.

The value (V) can be of any length (including zero) up to the maximum allowed by the length section (S). Items with the same data name do not have to be of the same length. In addition the format of the value can be alphanumeric, packed decimal, floating point, bit string, etc., and any other format which can be handled by the system including coded data, actual conventional records or sequences of conventional program instructions in any high level or machine language. In practice a restriction on the actual formats allowed would be imposed by the size and organization on the control information (section R).

A statement is a collection of several items. The structure of a file (i.e. a list of statements) is generally branched with items common to several statements being placed at the beginning of those statements and appearing only once in that section of the file. Each statement is terminated by an end-of-statement indicator, which is carried in the R section of the control word of the last item of the statement. The sharing of common items between several statements is defined by means of the level numbers. The nature of the level numbers will be evident from an inspection of the following table I, which is a part of a file containing complex chemical information. In this table, commas are used to mark the ends of items and fullstops as end-of-statement indicators. Items 1–5 form the first statement; items 1–4 and 6 form the second statement; items 1–4 and 7–9 form the third statement, items 1–4 and 7, 10, 11 form the fourth statement, items 1 and 12–14 form the fifth statement etc. The items in the table have been indented in correspondence with their level numbers. Each statement consists of items in sequentially ascending order of level number.

Table II illustrates a file referring to the same subject field as table I but representing a series of information retrieval requests. In this file the statements are 1–3; 1, 4–6; 1, 7–9, 11; 1, 7–8, 10–11; 12. The third and fourth of these contain two items (9,10) with an 'OR' relationship between them. By organizing the level numbering in an appropriate manner very complex AND/OR relationships can be constructed in this manner.

TABLE I

[A File Containing Chemical Information]

| Item No. | Item | Level |
|---|---|---|
| 1 | COMPOUND=ACRIDINE, | 1 |
| 2 | ASPECT=DIPOLE MOMENTS, | 2 |
| 3 | SOLVENT=BENZENE, | 3 |
| 4 | PAGE=356, | 4 |
| 5 | FORMAT=TABLE. | 5 |
| 6 | MOMENT=1.95. | 5 |
| 7 | POSITION=5, | 5 |
| 8 | DERIVATIVE=AMINO, | 6 |
| 9 | MOMENT=4.13. | 7 |
| 10 | DERIVATIVE=CHLORO, | 6 |
| 11 | MOMENT=0. | 7 |
| 12 | ASPECT=IONISATION CONSTANTS, | 2 |
| 13 | FORMAT=REVIEW, | 3 |
| 14 | PAGE=340. | 4 |
| 15 | PAGE=344, | 3 |
| 16 | PK=5.6. | 4 |
| 17 | DERIVATIVES=ALL, | 4 |
| 18 | FORMAT=TABLE. | 5 |
| 19 | ASPECT=MOLECULAR ORBITAL CALCULATIONS, | 2 |
| 20 | METHOD=L—H & C, | 3 |
| 21 | PAGE=67, | 4 |
| 22 | FORMAT=DIAGRAM. | 5 |
| 23 | FORMAT=TABLE. | 5 |
| 24 | POSITION=1, | 5 |
| 25 | CHARGE=+0.03 | 6 |
| 26 | POSITION=2, | 5 |
| 27 | CHARGE=+0.05 | 6 |
| etc. | | |

TABLE II

Some Information Retrieval Requests]

| Item No. | Item | Level |
|---|---|---|
| 1 | COMPOUND=ACRIDINE, | 1 |
| 2 | PK=ALL, | 2 |
| 3 | ACTION=OUTPUT FACTS. | 3 |
| 4 | REAGENT=HYDROGEN, | 2 |
| 5 | METHOD=CATALYSIS, | 3 |
| 6 | ACTION=OUTPUT FACTS. | 4 |
| 7 | ASPECT=DIPOLE MOMENTS, | 2 |
| 8 | SOLVENT=BENZENE, | 3 |
| 9 | DERIVATIVE=AMINO, OR | 4 |
| 10 | DERIVATIVE=CHLORO, | 4 |
| 11 | ACTION=OUTPUT FACTS. | 5 |
| 12 | ACTION=END OF FILE. | 0 |

BASIC COMPARISON PROCESS

Figure 1B:
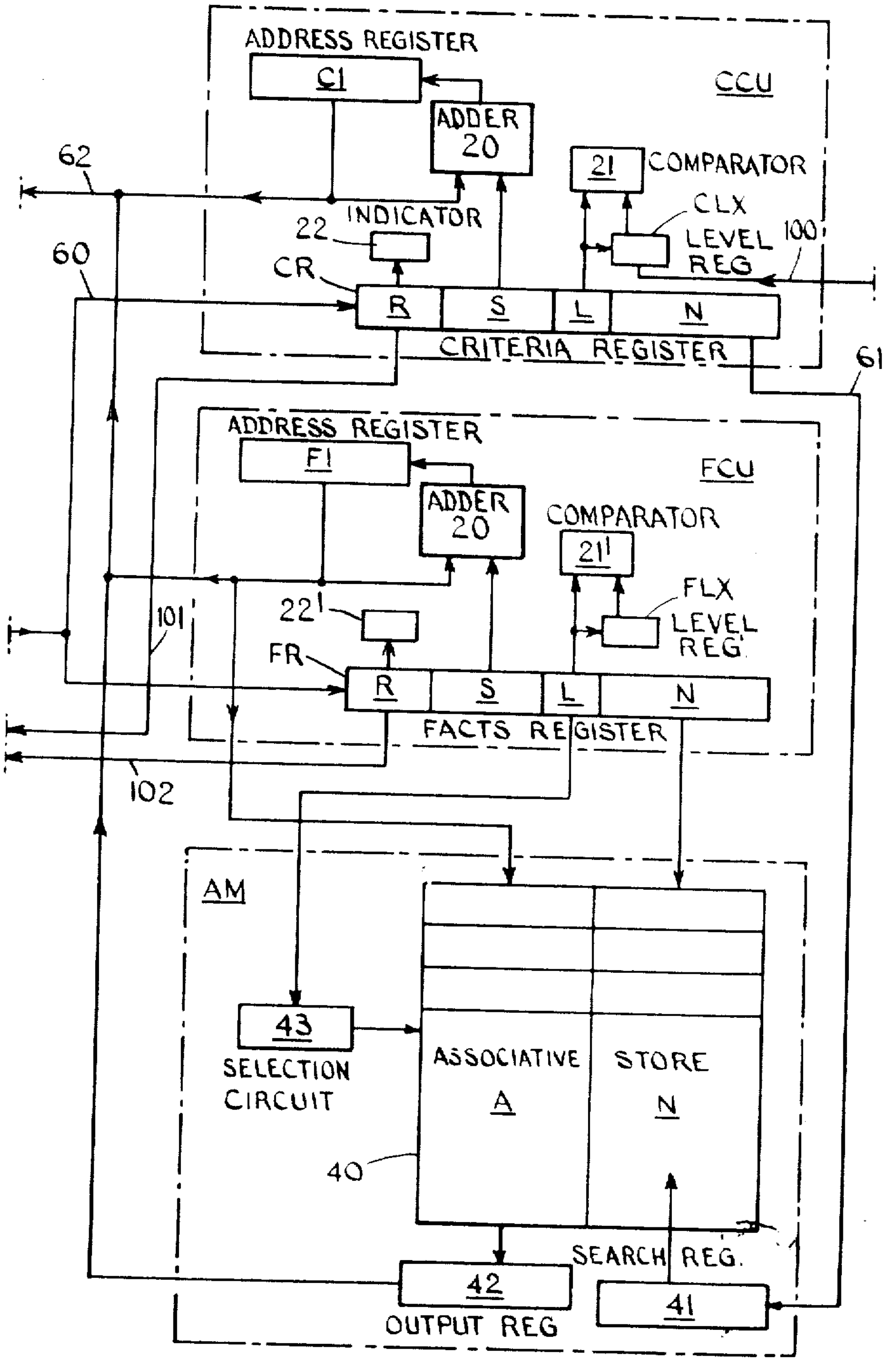

In operation, two files of statements are used, one being the criteria file, the other the facts file. Both these files are initially stored in the main memory MM (FIG. 1A). The operation starts with the loading of the first facts statement from the main memory MM into the associative memory (AM) (FIG. 1B). To minimize the size of the associative memory and the amount of shifting of data around in the system, only the data names (N) of the facts items together with the addresses of these items in the main memory need to be stored in the associative memory. Each criteria statement of the criteria file is then compared in turn with the facts statement. Each criteria statement consists of a number of items which are selected in sequence. As each criteria item is selected, the associative memory is inspected to see whether it contains the data name specified by the current criteria item. If it does, then the rest of the relevant facts item is looked up from the main memory and compared with the criteria item to see whether the values of these two items match. If they do match, a Hit has occurred, and the next criteria item is selected and the process is repeated. This continues until the selected criteria item has the end of statement indicator set in section R of its item control word. The item is then analyzed and action taken as specified by that item. If on the other hand the name specified by the current criteria item is not in the associative memory, or if it is but the values do not match, a Miss has occurred. The remaining items of the current criteria statement are then passed over, and any further criteria statements which include the item on which the miss occurred are also passed over, the passing over process continuing until an item with the same or lower level number is reached. To avoid the danger of the end of the physical file or block or other division of data being missed the end of each such unit of data is indicated by an item with level zero, this level being reserved for this purpose.

An example of this operation will now be described, taking the files of tables I and II as the fact file and the criteria file respectively. A sequence of events is listed in table III. The first event (event 1) of table III consists of the loading of the first facts statement i.e. items 1–5 of table I, into the associative memory (AM). The next event, event 2, is the selection of the first item of the first criteria statement, i.e. item 1 of table II. In event 3, the name portion (N) of the selected criteria item (COMPOUND) is read and an inspection of the AM shows that this name is present therein. Event 4 is the reading of section R and value parts of the criteria item (i.e. ACRIDINE) and the comparison of this with the same parts of the corresponding fact item. These parts are in fact looked up from the main memory. In this case, a match occurs, and a Hit is therefore registered between the criteria item and the fact statement. As the first item was at level 1 this means that the next item to be examined must be at level 2. The next event, event 5, is therefore the selection of the next item with level equal to 2 (i.e. item 2). Event 6 is the comparison of the name of this item (i.e. PK) with the contents of the AM: this results in a Miss. Accordingly, the next criteria item to be selected is the next one in the criteria file with a level not greater than the level of the item on which the Miss has just occurred (i.e. level 2 or less). Thus any further criteria items in the previous criteria statement, and any other criteria statements including the item on which the Miss has occurred, are skipped over. Event 7 is therefore the selection of item 4 from the criteria file. Event 8 is the comparison of the name of this item with the AM, resulting in a Miss. Event 9 is therefore the selection of item 7 from the criteria file, and events 10 and 11 are the comparisons of the name of this item with the AM and of its logical relationships and value with the corresponding fact item found in the MM. This results in a Hit, and events 12–14 are therefore the selection and checking of the next item, item 8, in the criteria file. This item also results in a Hit, and events 15 and 16 therefore comprise the checking of item 9 of the criteria file. This results in a Miss, and item 10 is therefore the next item selected (event 17), and this item is also found to give a Miss (event 18).

The next item to be selected should have a level value of four or less. In fact item 12 has a level of zero. It is examined (event 19) and found to be both the end of a statement and an action item signifying the end of the criteria file. The appropriate operations will be discussed later and for the purposes of this example it can be assumed that processing continues by inputting the next fact statement and returning to the start of the criteria statements.

The next event, event 20, is therefore the loading of the next statement in the fact file into the AM. This results in the AM now containing items 1–4 and item 6 of the fact file. In the next event, event 21, the same comparison of the criteria file items against the new statement in the AM is performed, as above, until the end of file item is again reached. Event 22 is therefore the loading of the next fact statement, items 1–4 and 7–9 into the AM. The comparison of the criteria items against the AM now results in a Hit with item 1 (event 23), Misses with items 2–4 (event 24), and Hits with items 7–9 (event 25). The next item to be selected should be at level 5 and is item 12. This is found to be the end of a statement by examining field R of the item control word (event 26).

The data name is examined and found to be an action (event 27) and the data value (which would probably be in a coded form) is examined and found to be a call to a routine which copies the facts (i.e. the data items in the AM) to a printer, with suitable editing on the way (event 28). The next event, event 29, is the loading of the next facts statement (items 1–4 and 7, 10 and 11) into the AM at the end of the criteria file being reached. The sequence of events then continues in the same general manner.

formation, S contains the overall length, L contains the level, and N the coded date name. The criteria control unit CCU also contains an address register C1. When a criteria item is to be looked up, register C1 contains the address of the item control word of this item. The contents of C1 are fed over line 62 to the selection circuit 11. The circuit 11 energizes the drive lines of the core store 10 in the conventional manner to read the desired item control words into the output buffer 12. The word is then transferred over line 60 to the register CR. The item control word portion of the item is therefore available. If it is then necessary to look at the remainder of the item (i.e. the value part), the contents of the S section of the register CR are decremented in unit steps until they become zero and the contents of the address register C1 are simultaneously incremented in unit steps. Thus the various words forming the item are selected in succession. The register C1 and portion S of the register CR are appropriately constructed as incrementing and decrementing counters. If on the other hand, it is not desired to inspect the value part of the item, then the contents of register C1 and the contents of section S of register CR are fed to adder 20, added together and the result stored back in register C1. Register C1 then contains the address of the item control word of the next item, assuming that the items are stored at consecutive addresses of the main store.

The criteria control unit also contains a register which can be filled from section L of the register CR. Thus the level of an item can be held in the register CLX while the item control words of following items are read into the register CR in succession. This stored level can therefore be compared with the level of an unselected item by means of a comparator 21. Register CLX is constructed as a counter, so that its contents can be automatically incremented by one. An end of statement indicator 22 is also included.

TABLE III

[Result of running the file of Table II against the file of Table I]

| | Data selected | Fact statement (contents of AM) | Event |
|---|---|---|---|
| 1 | | Items 1–5 | Fact items 1–5 read into AM. |
| 2 | Item 1 | do | Criteria item 1 selected. |
| 3 | 'COMPOUND'' | do | Name present in AM. |
| 4 | '=ACRIDINE' | do | Values match—HIT. |
| 5 | Item 2 | do | Next criteria item selected. |
| 6 | 'PK' | do | Name absent from AM—MISS. |
| 7 | Item 4 | do | Next criteria item selected. |
| 8 | 'REAGENT' | do | Name absent from AM—MISS. |
| 9 | Item 7 | do | Nest criteria item selected. |
| 10 | 'ASPECT' | do | Name present in AM. |
| 11 | '=DIPOLE MOMENTS' | do | Values match—HIT. |
| 12 | Item 8 | do | Next criteria item selected. |
| 13 | 'SOLVENT' | do | Name present in AM. |
| 14 | '=BENZINE' | do | Values match—HIT. |
| 15 | Item 9 | do | Next criteria item selected. |
| 16 | 'DERIVATIVE' | do | Name absent from AM—MISS. |
| 17 | Item 10 | do | Next criteria item selected. |
| 18 | 'DERIVATIVE' | do | Name absent from AM—MISS. |
| 19 | Item 12 | do | End of file reached. |
| 20 | | 1 to 4, 6 | Next Fact statement loaded. |
| 21 | | do | Criteria statements tested, end of file reached. |
| 22 | | 1 to 4, 7 to 9 | Next Fact statement loaded. |
| 23 | Item 1 | do | HIT. |
| 24 | Items 2 and 4 | do | MISS. |
| 25 | Items 7 to 9 | do | HIT. |
| 26 | Item 11 | do | End of statement. |
| 27 | 'ACTION' | do | Action item recognised. |
| 28 | 'OUTPUT FACTS | do | Contents of AM printer out. |
| 29 | Item 12 | 1 to 4, 7, 10 and 11 | End of file reached; next Fact statements loaded. |

BASIC SYSTEM STRUCTURE

Referring to FIGS. 1A and 1B, the general organization of the system will now be described. The system includes a main memory unit MM. a fact control unit FCU and a criteria control unit CCU, an associative memory AM, and a comparator unit CMP. The main memory unit MM comprises a core store or similar store 10, with selection circuitry 11 and an output buffer 12.

The criteria control unit CCU and the facts control unit FCU are very similar. Considering first the former, this contains a one-word criteria register CR which holds an item control word, and is divided into the same four sections R, S, L and N. R contains the logical relationship and other control in- The fact control unit is used in a slightly different manner and register FLX is not constructed as a counter.

The associative memory AM consists of a storage unit 40 comprising a set of registers each comprising two sections A and N. The registers of the storage unit 40 can be individually addressed under the control of section L of register FR by means of selection circuitry 43; when so addressed, data can be written into or read from them. The N sections of these registers are further arranged associatively, so that any of these registers is selected if the contents of its N section are identical to the contents of a search register 41; the contents of the A section of the selected registers are then read out in turn to an output register 42.

The comparator unit CMP (FIG. 1A) comprises two one-word registers FV and CV which can be filled from the main memory unit MM, a logic comparison circuit 30 which is fed with the R portions of the fact and criteria words, and a value comparison circuit 31 which is fed from the two registers FV and CV and the circuit 30. This comparator unit CMP is used to compare the R portions and the values of a fact item and a criteria item if their names have been found to match. In the event of a match the level in the CLX register is incremented by 1 by a signal applied over line 100, no action being taken if a mismatch occurs.

BASIC SYSTEM OPERATIONS

The operation of this system (FIG. 1) will now be described with reference to table IV, which is a sequence table; a conventional microprogram unit (not shown) is used to achieve the correct sequencing. The first operation in the sequence is operation 10 (fill AM). Fact address register F1 is loaded initially with the address of the first word of the first fact item. This word is read from the main memory MM via buffer 12 and line 60 into register FR. The first register of the storage unit 40 of the AM is then selected by the level portion (which is 1 for the first item) of the word in register FR, and the name (in the N portion of register FR) and the address (in register F1) of this word are written into the N and A sections of this first register of unit 40. If the item is not the last item of a statement (as determined by detector 22'), then the contents of the S portion of register FR are then added to the contents of register F1 by adder 20' and the contents of the L portion of register FR stored in register FLX. The control word of the next fact item is then looked up from the main memory under control of the new address in register F1 and written into register FR as before, The level is compared with the value in FLX to check that it is one higher (the procedure if not is discussed later) and if it is, the name and address are written into the storage unit 40 as before. This process is continued until an item containing an end of statement indicator is reached. Thus at the end of this process the storage unit 40 contains the names and addresses of all items of the first facts statement.

The next operation, operation 11, is the looking up of the first criteria item. Actually only the item control word of this item is looked up at this stage. The address is loaded initially in register C1 and this register controls transfer of the item control word in the manner already described into register CR. The next operation, operation 12 is the determination of whether the current criteria item is the end of a statement or not. This is indicated by the setting of the indicator 22. Assuming for the moment that the item is not the end of a statement then the test operations of block 13 follow. The first of these is operation 14, test AM, in which the name of the criteria item is fed from portion N of the register CR via line 61 to register 41 of the associative memory AM and compared with the names in the storage unit 40. If the comparison fails, then a Miss has occurred and the next operation is 18. Assuming however that a match occurs between the name of the criteria item and one of the names in unit 40, then the address of the fact item with that name is read out into register 42. This address is then fed to the main memory unit MM over line 62 and the control word of the facts item is read out and stored in register FR. The R portions of the criteria and facts items are then fed to unit 30 via lines 101 and 102 and compared to perform operation 15, determine logic. The value parts of these items are then read out word by word from the main memory 10 into the registers FV and DC under the control of address registers 42 and C1 respectively register 42 is constructed as an incrementing counter and both these registers are incremented continually during this operation until the end of one or both data values is reached. Operation 16, compare values, is therefore performed, and when the comparison of the values has been completed it is known that either a Hit or a Miss has occurred.

If a Hit has occurred register CLX is incremented by 1 (operation 17), whereas this operation is omitted if a Miss has occurred. In either case the next operation is 18, which consists of adding the contents of the S section of the CR register into register C1, thereby producing the address of the word of the next criteria item, and reading this word from the main memory into register CR. Operation 19 consists of comparing the value of the level in register L with that in register CLX. If L contains the higher number, operations 18 and 19 are repeated until this condition no longer holds. If the value in L and CLX are identical, processing continues at operation 12 as the data item whose control word has now been selected and written into register CR is the next one that needs to be examined in detail. If the value in L is lower than that in CLX tests are made to see if special conditions occur. Such conditions include reaching the end of one block of data on a magnetic tape, in which case the next block is read into MM (buffering being used as appropriate) and the contents of register C1 adjusted to the new address. Other conditions include the testing of control parameters which will be discussed later. If no special conditions are detected the next operation is 12 (if the last comparison the CMP unit was a Miss) or 18 if it was a Hit.

If operation 12 reveals that the current criteria item is the end of a statement the data name field N is tested to see if it has the coded value equivalent to an action. If the item is an action it is analyzed to see what requires doing (operation 20). This will be discussed in detail later, but one action ("next statement") that is required for the serial scanning of files will be described here. When this action is encountered the address of the first criteria item will be reset in register C1 (using control procedures outlined below) and then the sequence returns to operation 10. The item control word of the next item in the fact file is read into the register FR, and its level number stored in register FLX. The level number also selects the appropriate register in storage unit 40, and the name and address of this item are stored in that register (thereby overwriting anything previously in that r register). The first word of next fact item is then read from MM into the register FR, and its level number compared with the stored level number in register FLX by the comparator 21'. If the level number of the current item is greater than that of the previous item then this current level number is stored in register FLX and the name and address of the item are written into the unit 40. This continues until the control word of the current item has the end of statement indicator set. The associative memory, AM, then contains the whole of the next facts statement; the only other operation necessary is to clear those registers in unit 40 which follow the last selected register.

This system is particularly suited for use with coded names. However, it is also possible to use uncoded names in this system. In general, this will require a modified item structure, to allow for the greater length of plain language names, using one bit to indicate whether the name is coded or uncoded, and for uncoded names using the N portion of the item for the first part of the name, storing the name length in the next work of the item, and storing the remainder of the name in the following part of the item. During the item comparison routine, the detection of identity between the N portions of a fact item and a criteria item must then be followed by a comparison of the remaining parts of the names. Complete name identity will be followed by examination of the LR portions and values of the items as before. Thus when the names are uncoded, the first part of each name is treated as the effective name and the remainder as part of the value of the item.

Where values are alphanumeric, these can of course be coded just as the names are coded. The decision as to whether or not to code alphanumeric values will depend upon the coding table size and look up time compared with the reduction of file size achieved.

In the above description, the example used for operation 15 ("determine logic") involved a simple test of the equality of the values of the two items. However, one may be interested in say all derivatives of acridine and a criteria item

DERIVATIVE = ANY would then be used. The "=ANY" is the logical relationship of the item, which has no value as such, and a name match is all that is required for a Hit. Again, one may wish to test whether a date in a criteria item is later than a date in a fact item. Further types of logic are therefore required.

TABLE IV

Sequence for FIG. 1.
START (Proceed to Operation 10)
10. Fill A.M. (Proceed to Operation 11)
11. Look up first criteria item. (Proceed to Operation 12)
12. End of statement? (If yes, Proceed to Operation 20)
(If no, Proceed to Operations 13, 14)
13. 14. Test A.M. for match. (No match, Proceed to Operation 18)
(Match, Proceed to Operation 15)
15. Determine logic. (Proceed to Operation 16)
16. Compare values. (Miss—Proceed to Operation 18)
(Hit—Proceed to Operation 17)
17. Increment criteria level. (Proceed to Operation 18)
18. Look up next criteria item. (Proceed to Operation 19)
19. Compare criteria level with stored level. (If greater—Proceed to Operation 18)
(If equal—Proceed to Operation 12)
20. Analyze action.

The actual logical relationship and value of an item define a subset of the set of all possible values which the name of the item can possibly have. For a Hit (assuming of course a name match), the two subsets defined by the fact and criteria items must have at least one element in common conventionally, two empty subsets are regarded as having a common element.

Certain combinations of the logical relationships of the two items always yield the same result, e.g. a Hit. Others yield a Hit or a Miss depending on the values of the items; for these cases, it is necessary to compare the values, determining whether the criteria value is greater than, equal to, or less than the fact value. The information as to which results of the comparison yield Hits and Misses can conveniently be stored in an 8×8 matrix whose rows and columns correspond to the 8 possible logical relationships of the fact and criteria items respectively.

SUMMARY OF PROCEDURES

Before considering further modifications and elaborations of the system, it may be desirable to summarize the general principles of the system as described so far, in relation to conventional systems.

Firstly, the data structure of all items is basically the same. There is no differentiation into sets of data items and sets of program instructions. The structure of an item may be regarded in the simplest way as consisting of a name (N) which enables the item to be identified as one of a particular class, control information (S), (L) and (R) which specify properties of the item such as the length, logical significance, etc., and value information which is the specific significance of that item. The flexibility of this structure may be illustrated by some examples. In table I, the value of item 6 is a numerical value, the value of item 5 may be regarded as a property and the value of item 3 of table II may be regarded as equivalent to a conventional program instruction.

The data items are assembled in statements. Each statement consists of a chain of logically related items, such as items 1–5 of table I. In order to save storage space, the statements are written in condensed form so that the common part of two, or more, statements is written once only. For example, items 1–4 of table I are common to several statements. The correct linkage of the items forming statements is ensured by the allocation of the level numbers of each item.

The basic operation is to compare two sets, or file, of statements, the fact file and the criteria file. The first fact statement is loaded into the associative memory AM and the first item of the first criteria statement is compared with the contents of AM. If agreement (a Hit) is found, the next criteria item is selected for comparison, and so on, until the last item of the criteria statement is reached. This item would usually be an action item, which is the equivalent of a conventional program instruction. For example, item 3 of table II will call a microprogram sequence, or a program subordinate, to print a fact statement on an output printer, the particular statement being determined by the print, at which a match with the criteria statement was obtained.

The criteria statements may include as many action items as are necessary to carry out the desired operations. The action items may include all the functions performed by conventional computer systems, including such arithmetic functions as 'Add,' 'multiply,' etc.

MODIFICATIONS

Action items may also be included in fact statements. The normal function of these items is to initiate 'housekeeping' operations in relation to the facts file. For example, if a facts file is recorded on several magnetic tapes, the last item on each tape, except the last, might be 'ACTION=END OF TAPE.' When this item is encountered during the normal comparing process, the necessary operations would be initiated to find the tape system which carries the continuation tape and to set up the system to read this tape. Other actions may be provided to deal with editing of the file data, and validity and security checks on the data.

Figure 2:
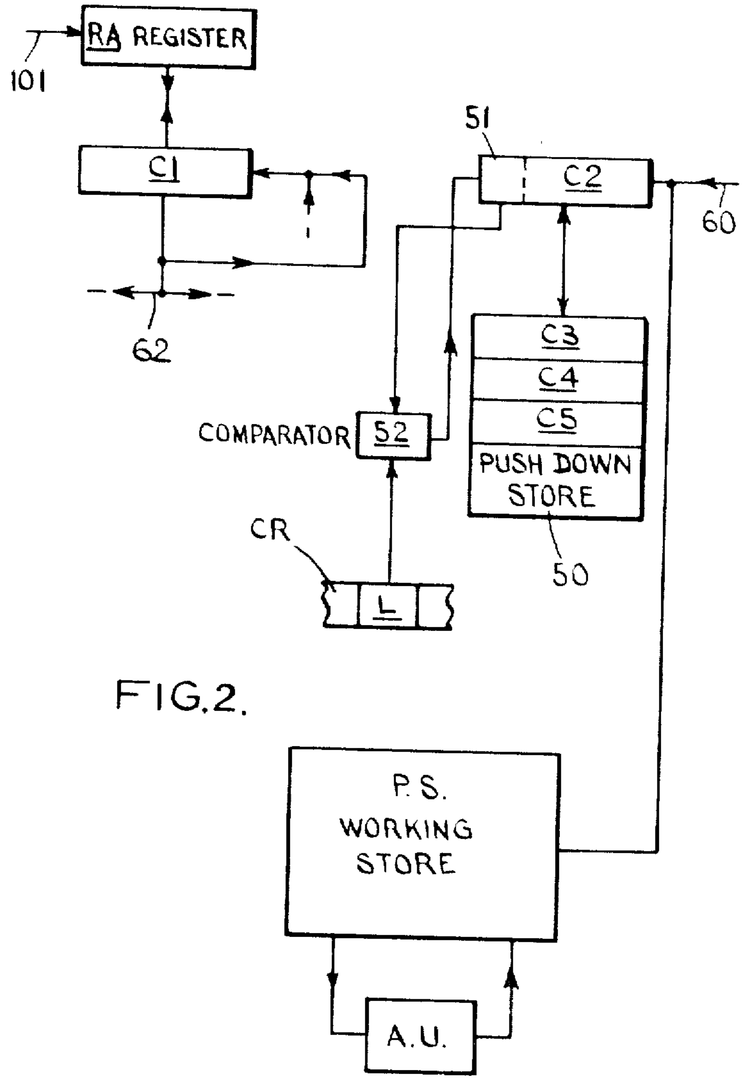
FIG. 2 shows modifications of the system of FIG. 1.

Further features which are of value in a comprehensive system are shown in FIG. 2.

Firstly, an additional register RA is provided for transferring address information to and from the address register C1. This simplifies the carrying out of recursive operations of various kinds. The address currently in C1 may be transferred to the register RA under control, for example, of an indicator bit in section R of the register CR. This address is retained in RA as further information flows through C1, and when desired the address may be returned to C1 under control, for example, of an indicator bit in the item then held in register CR.

A register C2 is connected to the main data transfer line 60 and to a stack of registers C3, C4, C5 etc., which form a push down store 50. A portion 51 of the register C2 contains the level information (L) of an item and the remainder of the register holds control information relating to the item. In the usual manner, an entry into register C2 causes the previous entry in that register to be pushed down into register C3, and similarly for other items in the stack. The transfer of an entry out of register C2 is controlled by comparator 52, which compares the level value in portion 51 with the current level value in section L of the register CR, and transfers out of C2 if the value in 51 is not greater than that in register CR. The transfer out of C2 cancels the entry and allows the contents of the stack to rise by one position. This arrangement allows control information in a particular item to remain in C2 available for control purposes while a succession of items of lower level are processed through the register CR.

The main data transfer line 60 is also connected to a working store PS. Data may be fed to the store PS under control of the comparison sequence so that, for example, a group of items which are to be printed may be assembled in PS prior to transfer to the printer. An arithmetic unit AU is also connected to the store PS, so that the operands of arithmetic operations can be fed to PS, processed by the arithmetic unit, and the results stored in PS.

The foregoing has described examples in which equality between fact and criteria items was necessary to secure a Hit. It will be appreciated that it is convenient in practice to provide a variety of comparison conditions. For example, it is useful to be able to compare for the 'not greater than' or 'or less than or equal to' conditions. Certain known types of associative store provide facilities for these kinds of comparison, of alternatively, these operations may be carried out by known forms of comparator. The selection of a particular comparison mode may be controlled by an indicator bit in the R section of an item, or by the control information set up in register C2. This selection under control of information included in the item may be applied generally to indicate a particular class, or type, of item which requires handling in a particular way, either as to the comparison conditions, arithmetic procedures, etc.

THE USE OF THE A.M. FOR SYSTEMS AND OTHER DATA

The AM should preferably be capable of having an item stored therein other than straightforward fact items of the current fact statement. It is also desirable for different items therein to be given different degrees of 'protection' so that certain items remain therein when others are removed. There are preferably four different categories of such items as follows (in order of decreasing degree of protection). Firstly, read only system data. These items cannot be changed by normal means and any may be used to ensure that access can normally be gained only to specific files. Secondly, running totals and other items carried forward from one statement to the next. These may be changed but must not be deleted when a new statement is entered. Thirdly, normal fact items, manipulated as described above. Fourthly, transient items such as items generated by arithmetic actions. Conventional memory protection techniques may be used for this purpose.

Under appropriate circumstances it should be possible to put dummy items in the AM, the 'address' associated with the name indicating a processing routine. Such a routine could be used when the AM contained a date and the criteria statement referred to a day of the week. The AM would then contain a dummy entry for 'DAY' with an address to a routine for calculating the day from the date. Such dummy items could be used whenever a nonstandard compare routine is needed.

ADJECTIVAL STATEMENTS

In cases where much complicated date is to be handled the ability to hold data in adjectival clauses is very valuable. For example:

COMPOUND = PHOSPHORUS,
(COLOR = RED), or

NAME = JOE BLOGGS,
RELATION = FATHER,
(NAME = JACK BLOGGS,
SCHOOL = HARROW.)

Such structures can be obtained by dividing the level section (L) into two parts, the normal level (as described previously) and the adjectival level which described the depth of the item within a nested series of adjectival clauses. The basic sequence is modified by introducing a test between events 16 and 17 of table IV. If the criteria item is followed by an adjectival clause (as judged by the adjectival level), the criteria adjectival clause is compared with the fact adjectival clause(s). This comparison can be done using the same basic routines as long as they have been organized so that they can be used recursively. In practice only one adjectival level is needed as more can easily be simulated by the use of action items. For example:

NAME = JOE BLOGGS,
RELATION = FATHER,
(ACTION = SEE.....)

What is claimed is:

1. A data processing system including a first memory for storing a plurality of fact and criteria statements, each statement including a sequence of fact and criteria items, respectively, and each item including a name portion, level number portion and value portion, a second memory for storing at least the name of each item of a fact statement, a criteria register for holding a control word of a current criteria item, the control word including the name portion and level number portion of the criteria item, first comparison means for comparing the name of a current criteria item with the names of the fact items in said second memory, second comparison means for comparing the value of said current criteria item with the value of a fact item upon the name of said current criteria item being successfully compared with the names of the fact items by said first comparison means, means for storing the level number portion of said criteria item and third comparison means for comparing said stored level number portion with subsequent level number portions of said sequence of criteria items in said criteria statement upon the name of said fact item being unsuccessfully compared with the name of said current criteria item by said first comparison means to determine the first item in a sequence of criteria items which has a level number not greater than said stored level number portion.

2. A data processing system as claimed in claim 1 including means for transferring the names of a predetermined fact statement from said first memory to said second memory.

3. A data processing system as claimed in claim 1 including,
a level number register associated with said criteria register and responsive to said second comparison means performing a successful comparison to increment the value stored in said level number register.

4. A data processing system as claimed in claim 3 in which the control word includes a length portion and including,
a criteria address register,
means for adding the value of the length portion stored in the criteria register to the value stored by the criteria address register;
and means for reading a stored criteria item into the criteria register under control of the value stored in the criteria address register.

* * * * *